(12) United States Patent
Yamamoto

(10) Patent No.: US 9,377,622 B2
(45) Date of Patent: Jun. 28, 2016

(54) LIGHT SOURCE UNIT AND PROJECTOR

(71) Applicant: CASIO COMPUTER CO., LTD., Shibuya-ku, Tokyo (JP)

(72) Inventor: Kyo Yamamoto, Higashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 9 days.

(21) Appl. No.: 14/134,940

(22) Filed: Dec. 19, 2013

(65) Prior Publication Data

US 2014/0176915 A1    Jun. 26, 2014

(30) Foreign Application Priority Data

Dec. 21, 2012 (JP) ................................ 2012-279031

(51) Int. Cl.
    *G02B 27/00* (2006.01)
    *G03B 21/20* (2006.01)
    (Continued)

(52) U.S. Cl.
    CPC ........ *G02B 27/0006* (2013.01); *G02B 19/0052* (2013.01); *G03B 21/204* (2013.01); *H04N 9/31* (2013.01); *H04N 9/3111* (2013.01); *H04N 9/3164* (2013.01)

(58) Field of Classification Search
    CPC ...... G03B 21/204; G03B 21/14; G03B 21/20; G03B 21/00; G03B 21/16; G02B 27/00; F21S 2/00; F21V 13/02; F21V 13/14; F21V 29/00; F21V 29/02; F21V 9/10; H04N 5/74; H04N 9/31
    USPC .......................................................... 353/31
    See application file for complete search history.

(56) References Cited

U.S. PATENT DOCUMENTS 7,691,765 B2   4/2010   Suzuki et al.
8,308,306 B2   11/2012  Miyazaki et al.
(Continued)

FOREIGN PATENT DOCUMENTS

CN   102200683 A   9/2011
CN   102610736 A   7/2012
(Continued)

OTHER PUBLICATIONS

Chinese Office Action (and English translation thereof) dated Jun. 30, 2015, issued in counterpart Japanese Application No. 201310757029.X.
(Continued)

*Primary Examiner* — Sultan Chowdhury
*Assistant Examiner* — Danell L Owens
(74) *Attorney, Agent, or Firm* — Holtz, Holtz & Volek PC

(57) ABSTRACT

A light source unit having a luminescent material plate tight sealing construction with a dust-proof measure where a luminescent material plate is sealed tight from a circumference thereof by attaching tightly a luminescent material plate holding metallic plate to a collective lens and a projector having the light source unit are provided. The light source unit has an excitation light source device emitting excitation light and a luminous light emitting device, and the luminous light emitting device includes a luminescent material plate on to which excitation light from the excitation light source device is shone to emit luminous light of a different wavelength from the excitation light, a substrate on which the luminescent material plate is rested, a collective lens covering the luminescent material plate, and a lens holder holding the collective lens, whereby the luminescent material plate is sealed tight by at least the substrate and the collective lens.

9 Claims, 8 Drawing Sheets

(51) Int. Cl.
*H04N 9/31* (2006.01)
*G02B 19/00* (2006.01)

(56) References Cited

U.S. PATENT DOCUMENTS

| | | | |
|---|---|---|---|
| 2002/0195546 A1* | 12/2002 | Yamaguchi et al. | 250/214.1 |
| 2006/0139918 A1* | 6/2006 | Dolgin | G02B 3/00 |
| | | | 362/232 |
| 2007/0002282 A1* | 1/2007 | Chen et al. | 353/31 |
| 2007/0075306 A1* | 4/2007 | Hayashi et al. | 257/13 |
| 2007/0152231 A1* | 7/2007 | Destain | 257/99 |
| 2010/0007267 A1* | 1/2010 | Imai et al. | 313/503 |
| 2011/0234998 A1 | 9/2011 | Kurosaki | |
| 2013/0021587 A1 | 1/2013 | Miyazaki et al. | |
| 2013/0242273 A1 | 9/2013 | Weichmann et al. | |

FOREIGN PATENT DOCUMENTS

| | | | |
|---|---|---|---|
| JP | 2006-282447 A | | 10/2006 |
| JP | 2011-013316 A | | 1/2011 |
| JP | 2012159685 A | * | 8/2012 |
| WO | 2012077021 A1 | | 6/2012 |

OTHER PUBLICATIONS

Chinese Office Action (and English translation thereof) dated Feb. 5, 2016, issued in counterpart Chinese Application No. 201310757029.X.

* cited by examiner

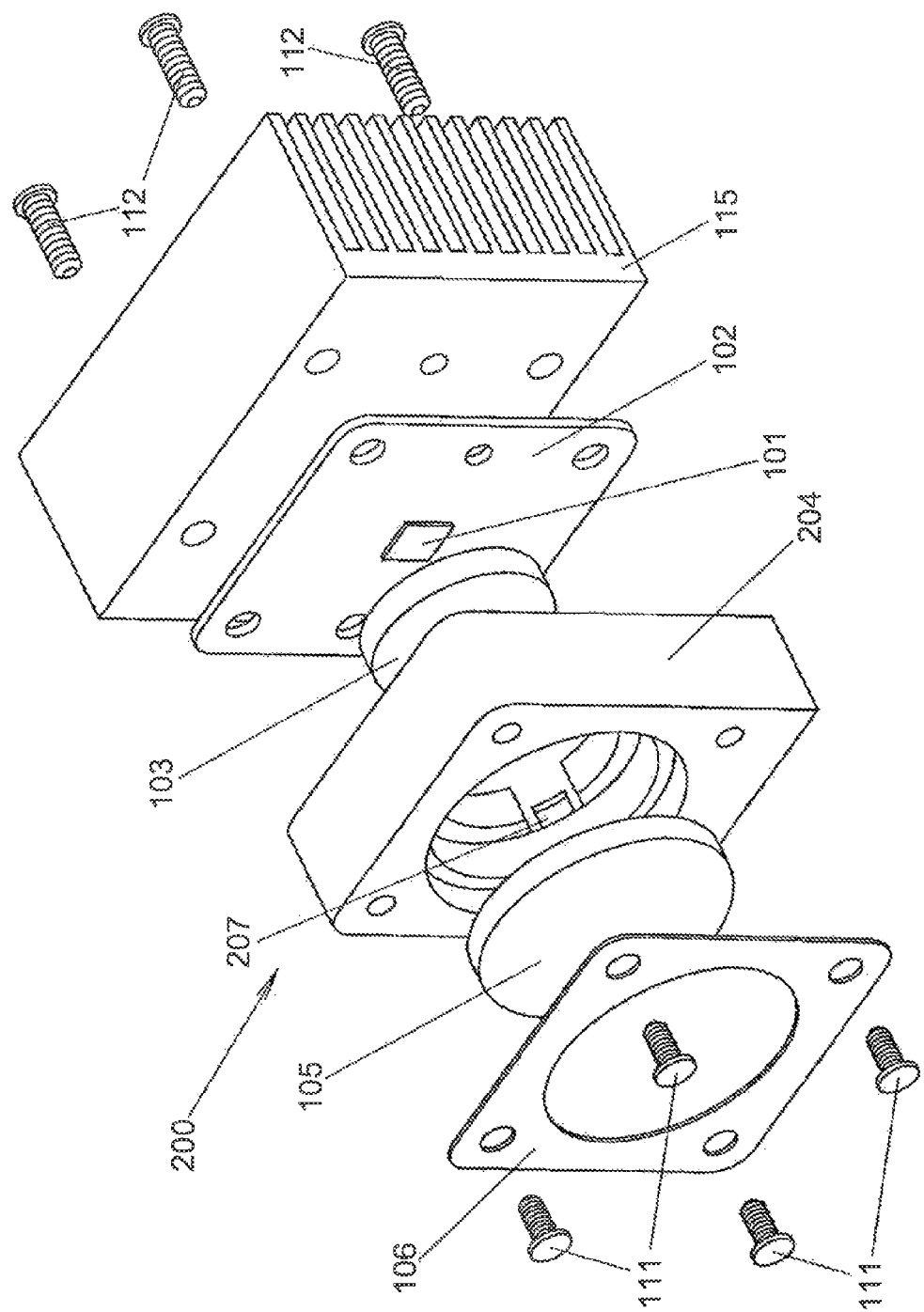

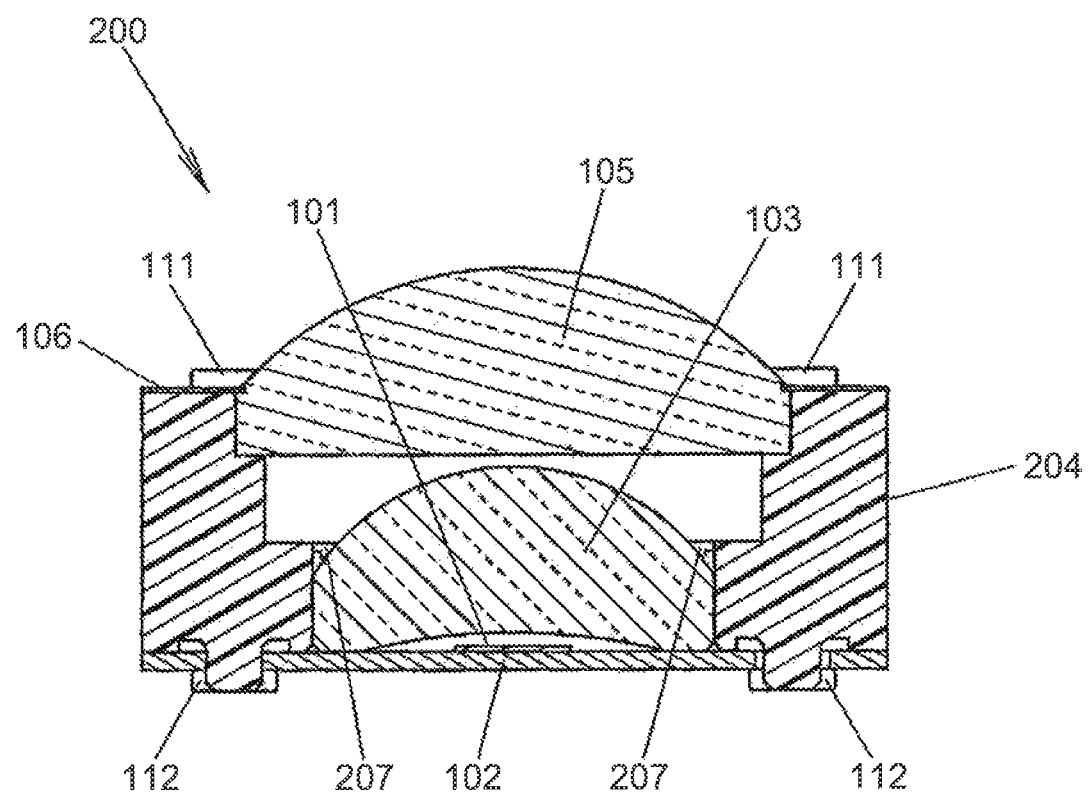

ial, depending upon configurations, the luminescent material does not have to be driven to rotate, which facilitates the reduction in size of a luminous light emitting device and a projector employing the same.
LIGHT SOURCE UNIT AND PROJECTOR

CROSS-REFERENCE TO RELATED APPLICATION

This application is based upon and claims the benefit of priority under 35 USC 119 from the prior Japanese Patent Application No. 2012-279031 filed on Dec. 21, 2012, the entire contents of which, including the description, claims, drawings and abstract, are incorporated herein by reference.

BACKGROUND OF THE INVENTION

1. Field of the Invention

The present invention relates to a light source unit including a luminescent material plate tight covering and sealing construction in which a luminescent material plate is covered and sealed tight from the circumference thereof.

2. Description of the Related Art

In these days, data projectors are used on many occasions as an image projection apparatus which projects images including an image of a screen and a video image of a personal computer, as well as images based on image data which is stored on a card such as a memory card on to a screen.

In these data projectors, light emitted from a light source is caused to converge at a micromirror display element called a DMD (Digital Micromirror Device) or a liquid crystal panel so that a color image is displayed on a screen.

In addition, the application of such projectors is expanding widely from commercial presentation to domestic use as personal computers and DVD players have been used generally and have been spread widely in the market.

Conventionally, the mainstream of these projectors has been those which utilize a high-intensity discharge lamp as a light source. In recent years, however, there have been made many developments and proposals on projectors which use, as a light source, a semiconductor light emitting element such as a laser diode.

For example, Japanese Unexamined Patent Application (KOKAI) No. 2011-013316 discloses a light source unit which includes an excitation light source which employs a laser diode to emit light of a blue wavelength range and a luminescent wheel (a rotational plate) which has a layer of luminescent material which absorbs the light emitted from the excitation light source to convert it into visible light and which is driven to rotate by a motor, and a projector which includes this light source unit.

In addition, a plurality of luminescent materials are dispersed in a resin binder which is made of a transparent silicone or epoxy resin to form a luminous light emitting layer.

This resin binder is deteriorated by the excitation light from the semiconductor light source or is damaged particularly when the intensity of the excitation light is high.

Additionally, the resin such as the silicone or epoxy resin in which the luminescent materials are dispersed has a low thermal conductivity, and therefore, the temperature of the luminescent materials is increased, generating a phenomenon such as temperature extinction in which the wavelength of light emitted from the luminescent materials is shifted or the intensity of such light is lowered by the increase in temperature.

This calls for a reduction in the luminance of the light source unit.

Additionally, as a luminescent material which is relatively strong against heat, there is known a luminescent material employing a sintered ceramic as described in Japanese Unexamined Patent Publication (KOKAI) No. 2006-282447 (JP-A-2006-282447).

In a projector which employs the luminescent wheel described above, it is difficult to make its light source unit small in size. However, with the ceramic luminescent material, depending upon configurations, the luminescent material does not have to be driven to rotate, which facilitates the reduction in size of a luminous light emitting device and a projector employing the same.

However, even with the luminescent material described in JP-A-2006-282447, when dust sticks to the luminescent material, the temperature of the luminescent material is increased to thereby carbonize the dust sticking to the luminescent material, leading to fears that the luminescent material is destroyed or the luminance of luminous light emitted therefrom is lowered.

SUMMARY OF THE INVENTION

The invention has been made in view of the problem inherent in the related art which is described above, and an object of the invention is to provide a light source unit which includes a luminescent material plate to which a dust-proof measure is applied and a projector which has the light source unit.

With a view to achieving the object, according to a first aspect of the invention, there is provided a light source unit having an excitation light source device which emits excitation light and a luminous light emitting device, wherein the luminous light emitting device includes a luminescent material plate on to which excitation light emitted from the excitation light source device is shone to emit luminous light of a wavelength which is different from that of the excitation light, a substrate on which the luminescent material plate is rested, a collective lens which covers the luminescent material plate, and a lens holder which holds the collective lens, and wherein the luminescent material plate is covered and sealed tight by at least the substrate and the collective lens.

According to a second aspect of the invention, there is provided a projector including a light source unit, a display element, a light source-side optical system which guides light from the light source unit to the display element, a projection-side optical system which projects an image emitted from the display element on to a screen, and a projector control unit which controls the light source unit and the display element, wherein the light source unit is the light source unit described in the first aspect of the invention.

BRIEF DESCRIPTION OF THE SEVERAL VIEWS OF THE DRAWINGS

FIG. 7 is an exploded perspective view of a luminous light emitting device according to the embodiment of the invention, and FIG. 8 is a sectional view of the luminous light emitting device according to the embodiment of the invention.

DETAILED DESCRIPTION OF THE PREFERRED EMBODIMENT

Hereinafter, an embodiment of the invention will be described in detail based on the drawings.

Figure 1:
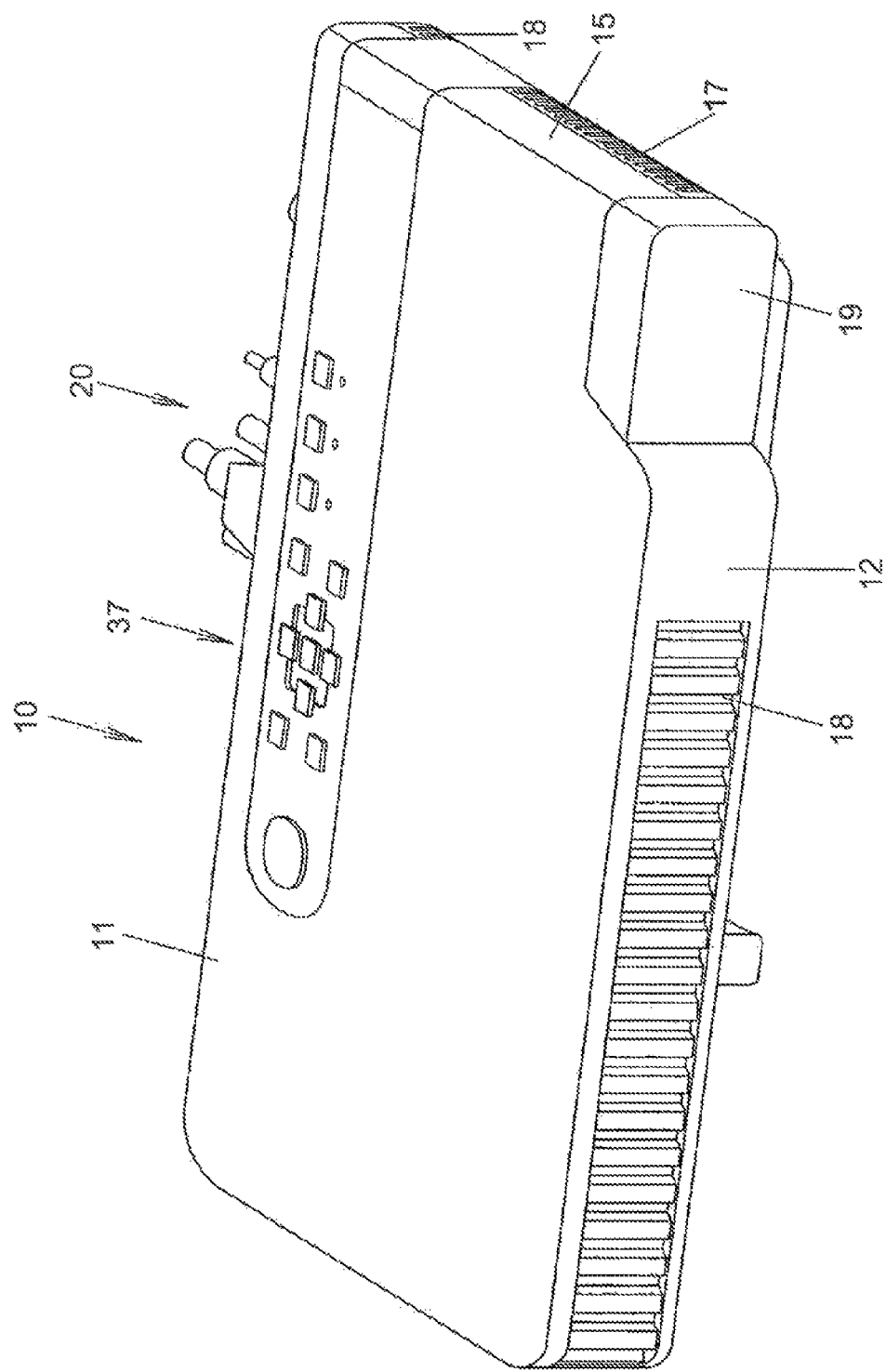
FIG. 1 is a perspective view of a projector according to an embodiment of the invention.

FIG. 1 is an external perspective view of a projector 10. In this embodiment, when left and right are referred to with respect to the projector 10, they denote, respectively, left and right with respect to a projecting direction, and when front and rear are referred to with respect to the projector 10, they denote, respectively, front and rear with respect to a direction towards a screen and the traveling direction of a pencil of light emitted from the projector 10 towards the screen.

As is shown in FIG. 1, the projector 10 has a substantially rectangular parallelepiped shape. The projector 10 has a lens cover 19 which covers a projection port which is disposed to a side of a front panel 12 which is referred to as a front side panel of a projector casing. Additionally, a plurality of outside air inlet slits 18 are provided in the front panel 12.

Further, although not shown, the front panel 12 includes an Ir reception unit which receives a control signal from a remote controller.

In addition, a keys/indicators unit 37 is provided on an upper panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when the light source unit, the display element, a control circuit or the like overheats.

Further, provided in a back side or a back panel of the projector casing are various types of terminals 20 such as an input/output connector unit where USB terminals, a video signal input D-SUB terminal, an S terminal and an RCA terminal into which analog RGB video signals are inputted, a voice output terminal and the like are provided; and a power supply adaptor plug.

Additionally, a plurality of outside air inlet slits are formed in the back panel. A plurality of inside air outlet slits 17 are formed in each of a right panel, not shown, which is a side panel of the projector casing and a left panel 15 which is a side panel shown in FIG. 1. In addition, outside air inlet slits 18 are also formed in a portion of the left panel 15 which lies in a corner portion formed between the back panel and the left panel 15.

Figure 2:
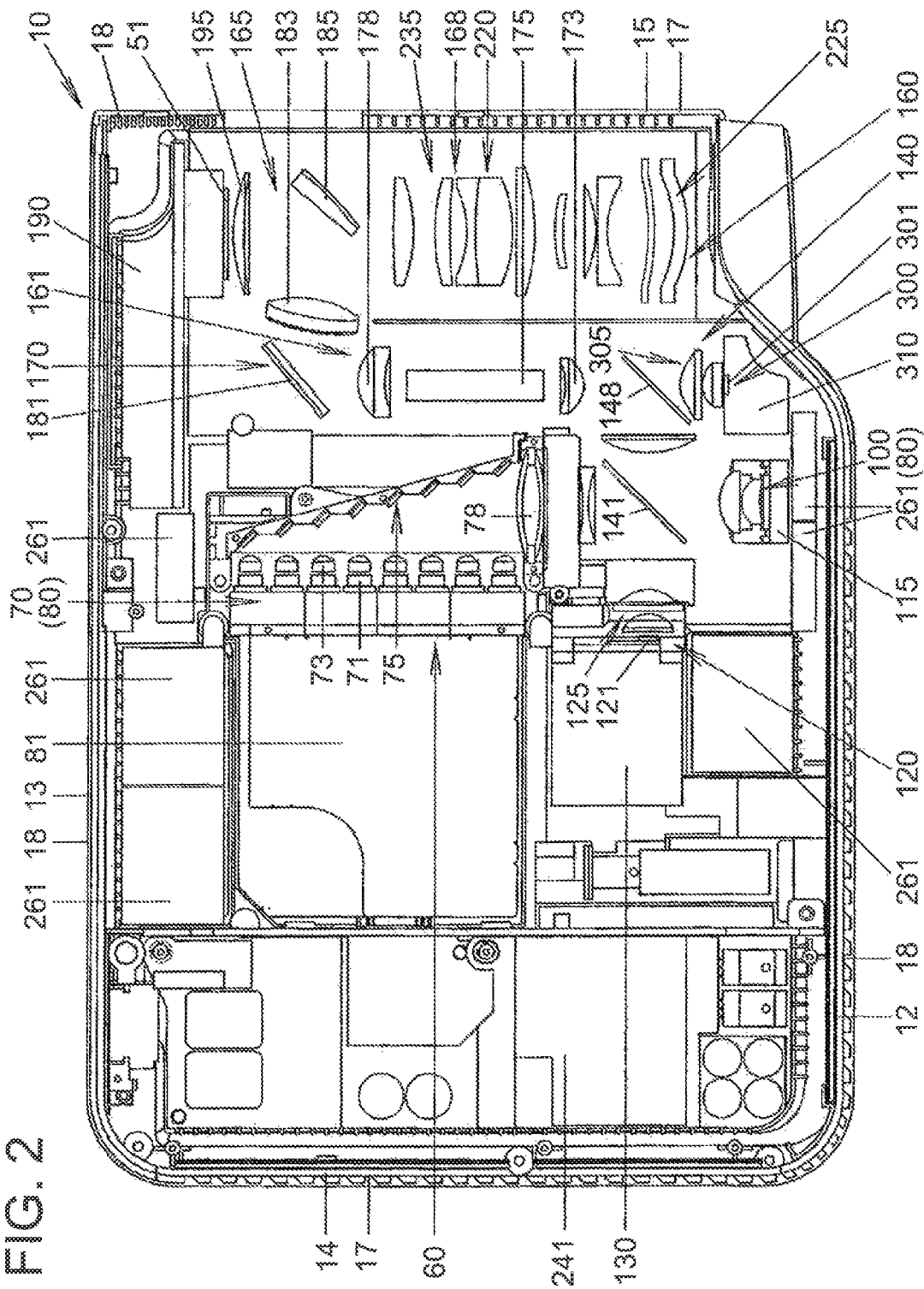
FIG. 2 is a plan view of the projector according to the embodiment of the invention with an upper panel removed.

Next, an internal construction of the projector 10 will be described. FIG. 2 is an exemplary plan view showing an internal construction of the projector 10.

As shown in FIG. 2, the projector 10 includes a control circuit board 241 in proximity to the right panel 14. This control circuit board 241 includes a power supply circuit block, a light source control block and the like. Additionally, the projector 10 includes a light source unit 60 which lies to a side of the control circuit board 241, that is, in a substantially central portion of the projector casing. Further, the projector 10 includes an optical system unit 160 between the light source unit 60 and the left panel 15.

The light source unit 60 includes a green light source device 80, a blue light source device 300, a red light source unit 120 and a light guiding optical system 140.

The green light source device 80 includes an excitation light source device 70 which is disposed at a substantially central portion in a left-to-right direction of the projector casing and in proximity to the back panel 13, a luminous light emitting device 100 which is disposed on an axis of a pencil of light emitted from the excitation light source device 70 and in proximity to the front panel 12, and a first dichroic mirror 141 which is disposed on an optical path of excitation light emitted from the excitation light source device 70 and between the excitation light source device 70 and the luminous light emitting device 100.

The blue light source device 300 is disposed in proximity to the front panel 12 in such away as to be parallel to a pencil of light emitted from the luminous light emitting device 100.

The red light source device 120 is disposed between the excitation light source device 70 and the luminous light emitting device 100.

The light guiding optical system 140 changes the directions of axes of light emitted from the luminous light emitting device 100, light emitted from the red light source device 120 and light emitted from the blue light source device 300 so that the axes are directed in the same direction in such a way that the green light, red light and blue light are collected to a predetermined plane or an entrance plane of a light tunnel 175.

The excitation light source device 70 of the green light source device 80 includes excitation light sources 71 made up of semiconductor light emitting elements which are disposed so that an axis of light emitted from each of the excitation light sources 71 becomes parallel to the back panel 13, a group of reflection mirrors 75 which changes the axis of light emitted from the excitation light sources 71 by 90 degrees in the direction of the front panel 12, a collective lens 78 which collects the light emitted from the excitation light sources 71 and reflected by the group of reflection mirrors 75 and a heat sink 81 which is disposed between the excitation light sources 71 and the right panel 14.

The excitation light sources 71 include 24 blue laser diodes which are arranged into a matrix of three rows and eight columns. In addition, collimator lenses 73 are individually disposed on each of axes of pencils of light which are respectively emitted from the corresponding blue laser diodes, and these collimator lenses 73 are collective lenses which convert the pencils of light which are emitted from the corresponding blue laser diodes into parallel light. In addition, the group of reflection mirrors 75 is such that a plurality of reflection mirrors are arranged into a staircase-like fashion. The reflection mirrors reduce respective sectional areas of the pencils of light emitted from the excitation light sources 71 in one direction for emission to the collective lens 78.

A cooling fan 261 is disposed between the heat sink 81 and the back panel 13, and the excitation light sources 71 are cooled by this cooling fan 261 and the heat sink 81. Further, a cooling fan 261 is also disposed between the group of reflection mirrors 75 and the back panel 13, and the group of reflection mirrors 75 and the collective lens 78 are cooled by this cooling fan 261.

The luminous light emitting device 100 of the green light source device 80 is disposed so as to be parallel to the front panel 12, that is, so as to be at right angles to an axis of light emitted from the excitation light source device 70. The luminous light emitting device 100 of the invention will be described in detail later.

Light emitted from the excitation light source device 70 to be shone on to a green luminescent material layer of the luminous light emitting device 100 excites a green luminescent material in the green luminescent material layer to emit luminous light in every direction from the green luminescent material, and the luminous light so emitted then emanates directly towards the excitation light sources 71.

Of excitation light which is reflected to a side of the luminescent material layer on a reflecting surface of the luminous light emitting device 100, excitation light which emanates towards the excitation light sources 71 without being absorbed by the luminescent material passes through the first dichroic mirror 141 which also constitutes a part of the green light source device 80, which will be described later, while the luminous light is reflected by the first dichroic mirror 141. Therefore, there is no such situation that the excitation light emanates to the outside of the light source unit 60.

The red light source device 120 includes a red light source 121 which is disposed so that an optical axis thereof becomes parallel to the excitation light sources 71 and a group of collective lenses 125 which collects light emitted from the red light source 121. The red light source device 120 is disposed so that an optical axis of light emitted therefrom intersects optical axes of the light emitted from the excitation light source device 70 and the light having a green wavelength range which is emitted from the luminous light emitting device 100. In addition, the red light source 121 is a red light emitting diode as a semiconductor light emitting element which emits light of a red wavelength range. Further the red light source device 120 includes a heat sink 130 which is disposed on a side of the red light source 121 which faces the right panel 14. Additionally, a cooling fan 261 is disposed between the heat sink 130 and the front panel 12, and the red light source 121 is cooled by this cooling fan 261.

The blue light source device 300 includes a blue light source 301 which is disposed so as to be parallel to an axis of light emitted from the luminous light emitting device 100 and a group of collective lenses 305 which collect light emitted from the blue light source 301. In addition, the blue light source device 300 is disposed so that an optical axis thereof intersects an optical axis of light emitted from the red light source device 120. The blue light source 301 is a blue light emitting diode which is a semiconductor light emitting element which emits light of a blue wavelength range. Further, the blue light source device 300 includes a heat sink 310 which is disposed on a side of the blue light source 301 which faces the front panel 12.

Additionally, a cooling fan 261 is disposed between the heat sink 310 and the front panel 12, and the blue light source 301 and the luminous light emitting device 100 are cooled by this cooling fan 261.

The light guiding optical system 140 includes collective lenses which collect pencils of light of the red, green and blue wavelength ranges and dichroic mirrors which change the directions of the axes of the pencils of light of the red, green and blue wavelength ranges so that the axes are directed in the same direction.

Specifically, the first dichroic mirror 141 which also constitutes a part of the green light source device 80 is disposed in a position where the axes of the light of the blue wavelength range which is emitted from the excitation light source device 70 and the light of the green wavelength range which is emitted from the luminous light emitting device 100 intersect the axis of the light of the red wavelength range which is emitted from the red light source device 120. This first dichroic mirror 141 transmits the light of the blue wavelength range which is the excitation light and the light of the red wavelength range and reflects the light of the green wavelength range which is the luminous light in such a way as to change the axis of the green light by 90 degrees in the direction of the left panel 15.

This first dichroic mirror 141 functions not only as a part of the light guiding optical system 140 but also as a separating mirror in the green light source device 80 which separates luminous light from excitation light.

It is noted that the first dichroic mirror 141 is not limited to the configuration in which the first dichroic mirror 141 is disposed on an optical path of excitation light from the excitation light sources to the luminescent material plate to function to transmit excitation light while reflecting luminous light. Depending upon the configuration of the light guiding optical system 140, the dichroic mirror may be configured so as to function to reflect excitation light while transmitting luminous light.

In addition, a second dichroic mirror 148 is disposed in a position where the axis of the light of the blue wavelength range which is emitted from the blue light source device 300 intersects the axis of the light of the red wavelength range which is emitted from the red light source device 120. This second dichroic mirror 148 transmits the light of the blue wavelength range and reflects the light of the green wavelength range and the light of the red wavelength range so as to change the directions of the axes of the green light and the red light by 90 degrees in the direction of the back panel 13. A collective lens is disposed between the first dichroic mirror 141 and the second dichroic mirror 148. Further, a collective lens 173 is disposed in proximity to the light tunnel 175. This collective lens 173 collects light source light to the entrance plane of the light tunnel 175.

The optical system unit 160 includes an illumination-side block 161 which is positioned to the left of the excitation light source device 70, an image generating block 165 which is positioned near a position where the back panel 13 intersects the left panel 15 and a projection-side block 168 which is positioned between the light guiding optical system. 140 and the left panel 15. The optical system unit 160 is formed into a substantially U-shaped configuration by these three blocks.

The illumination-side block 161 includes a part of a light source-side optical system 170 which guides light source light emitted from the light source unit 60 to a display element 51 of the image generating block 165. The part of the light source-side optical system 170 which is possessed by the illumination-side block 161 includes the light tunnel 175 which converts the pencil of light emitted from the light source unit 60 into a beam of light in which the intensity of light is uniformly distributed, a collective lens 178 which collects light emanating from the light tunnel 175 and a light axis changing mirror 181 which changes the direction of an axis of a pencil of light emanated from the light tunnel 175 to the direction of the image generating block 165.

The image generating block 165 has, as the light source-side optical system 170, a collective lens 183 which collects the light source light which is reflected on the light axis changing mirror 181 to the display element 51 and a shining mirror 185 which shines the pencil of light which passes through the collective lens 183 on to the display element 51 at a predetermined angle. Further, the image generating block 165 includes the display element 51 which is a DMD. In addition, a heat sink 190 is disposed between the display element 51 and the back panel 13, so that the display element 51 is cooled by the heat sink 190. Additionally, a condenser lens 195 which makes up a part of a projection-side optical system 220 is disposed in proximity to the front of the display element 51.

The projection-side block 168 has a group of lenses of the projection-side optical system. 220 which projects on-light which is reflected by the display element 51 on to the screen. The projection-side block 168 includes, as the projection-side optical system 220, a group of fixed lenses 225 which is incorporated in a fixed lens barrel and a group of movable lenses 235 which is incorporated in a movable lens barrel. The group of lenses of the projection-side optical system 220 is made into a variable-focus lens having a zooming function, and the group of movable lenses 235 is moved by a lens motor for zooming and focusing.

Figure 3:
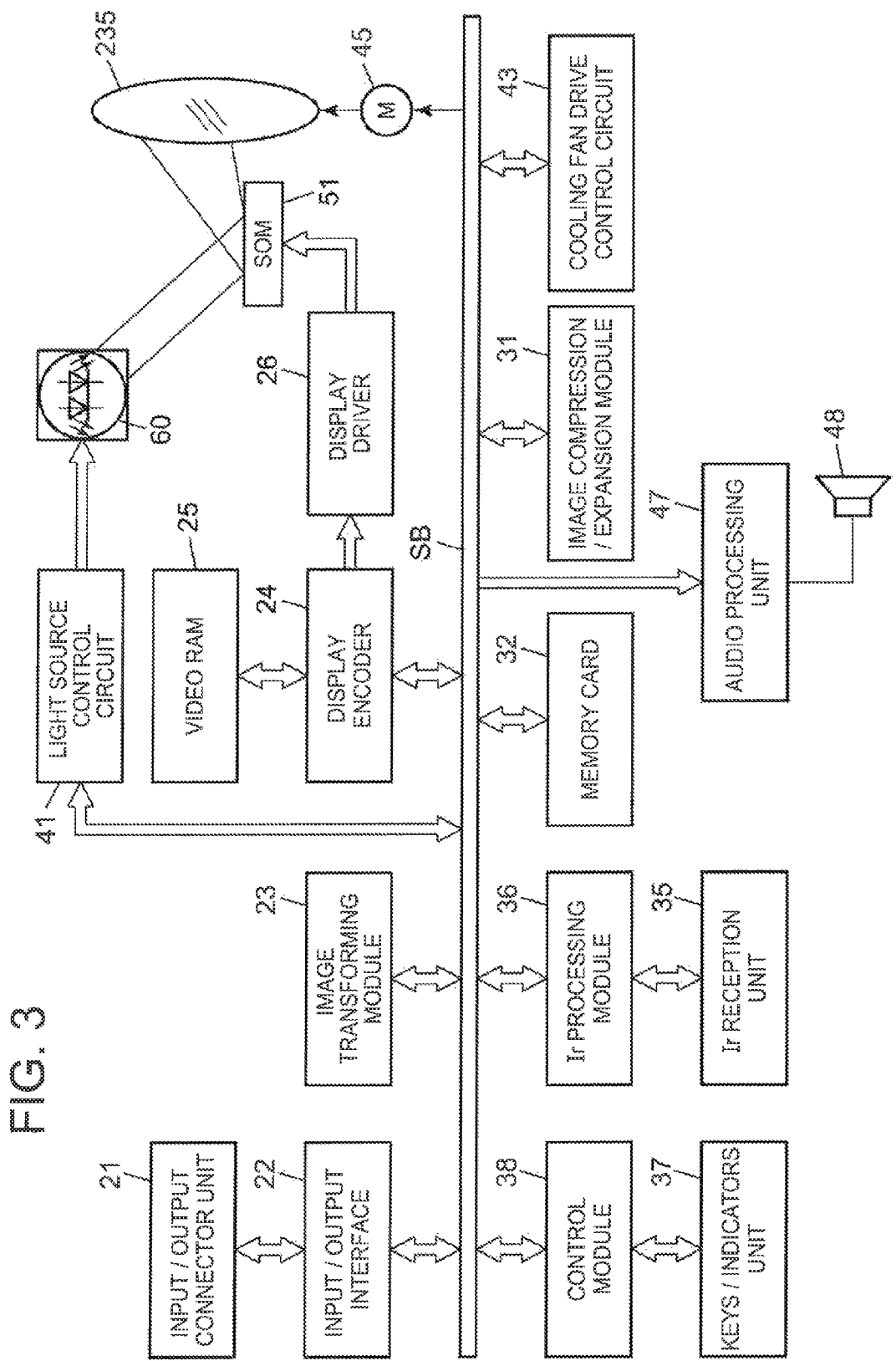
FIG. 3 is a functional block diagram of the projector according to the embodiment of the invention.

Next, the projector control unit of the projector 10 will be described by the use of a functional block diagram shown in FIG. 3. The projector control unit includes a control module 38, an input/output interface 22, an image transforming module 23, a display encoder 24, a display driver 26 and the like. The control module 38 governs the control of respective operations of circuitries within the projector 10 and includes a CPU which is a microprocessor or the like, a ROM which stores in a fixed fashion operation programs of various types of settings, a RAM which is used as a working memory and the like.

Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display element control module and drives the display element 51, which is a spatial optical modulator (SOM), at an appropriate frame rate in response to the image signal outputted from the display encoder 24 so as to shift mirrors of the display element 51 to "on" positions or "off" positions so that light shone from the light source unit 60 is reflected for projection or absorbed (is reflected to the other (different) direction for projection). By driving the display element 51 in that way, in this projector 10, the pencil of light which is emitted from the light source unit 60 is shone on to the display element 51 via the light source-side optical system 170 to thereby form an optical image based on reflected light which is reflected by the display element 51. The image so formed is then projected on to a screen, not shown, for display thereon via the projection-side optical system 220. In addition, the movable lens group 235 of the projection-side optical system 220 is driven by a lens motor 45 for zooming or focusing.

An image compression/expansion module 31 performs a recording operation in which a luminance signal and a color difference signal of an image signal are data compressed through ADCT and Huffman coding processes and the compressed data is sequentially written on a memory card 32 which is configured as a detachable recording medium. Further, when in a reproducing mode, the image compression/expansion module 31 reads out image data recorded on the memory card 32 and expands individual image data which make up a series of dynamic images frame by frame. Then, the image data is outputted to the display encoder 24 via the image transforming module 23 so as to enable the display of dynamic images and the like based on the image data stored on the memory card 32.

Operation signals generated at the keys/indicators unit 37 which includes the main keys, indicators and the like provided on the upper panel 11 of the projector casing are sent out directly to the control module 38. Key operation signals from the remote controller are received by the Ir reception unit 35, and a code signal demodulated at an Ir processing module 36 is outputted to the control module 38.

In addition, an audio processing unit 47 is connected to the control module 38 via the system bus (SB). This audio processing unit 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control module 38 controls a light source control circuit 41 which is configured as a light source control unit. This light source control circuit 41 controls individually the light emitting timings of the red light source device 120, the green light source device 80 and the blue light source device 300 of the light source unit 60 so that light of predetermined ranges of wavelengths which is required when an image is generated is emitted from the light source unit 60.

[Covering and Sealing Form 1]

Next, referring to the drawings, the luminous light emitting device 100 will be described in detail which has a luminescent material plate tight covering and sealing construction in which a dust-proof measure is implemented by covering and sealing tight a luminescent material plate 101 from the circumference thereof.

Figure 4:
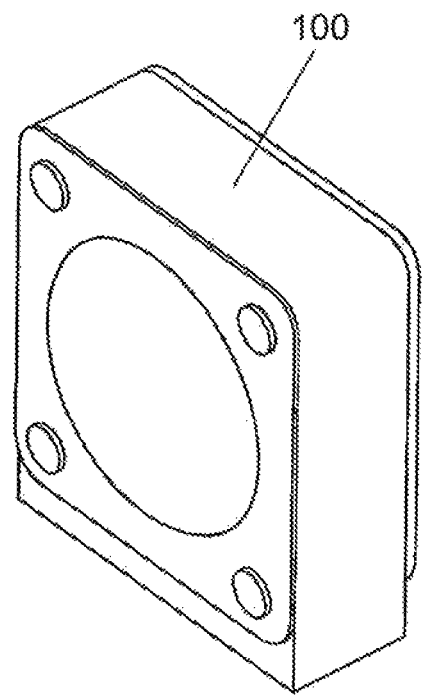
FIG. 4 is an external perspective view of a luminous light emitting device according to the embodiment of the invention.
Figure 5:
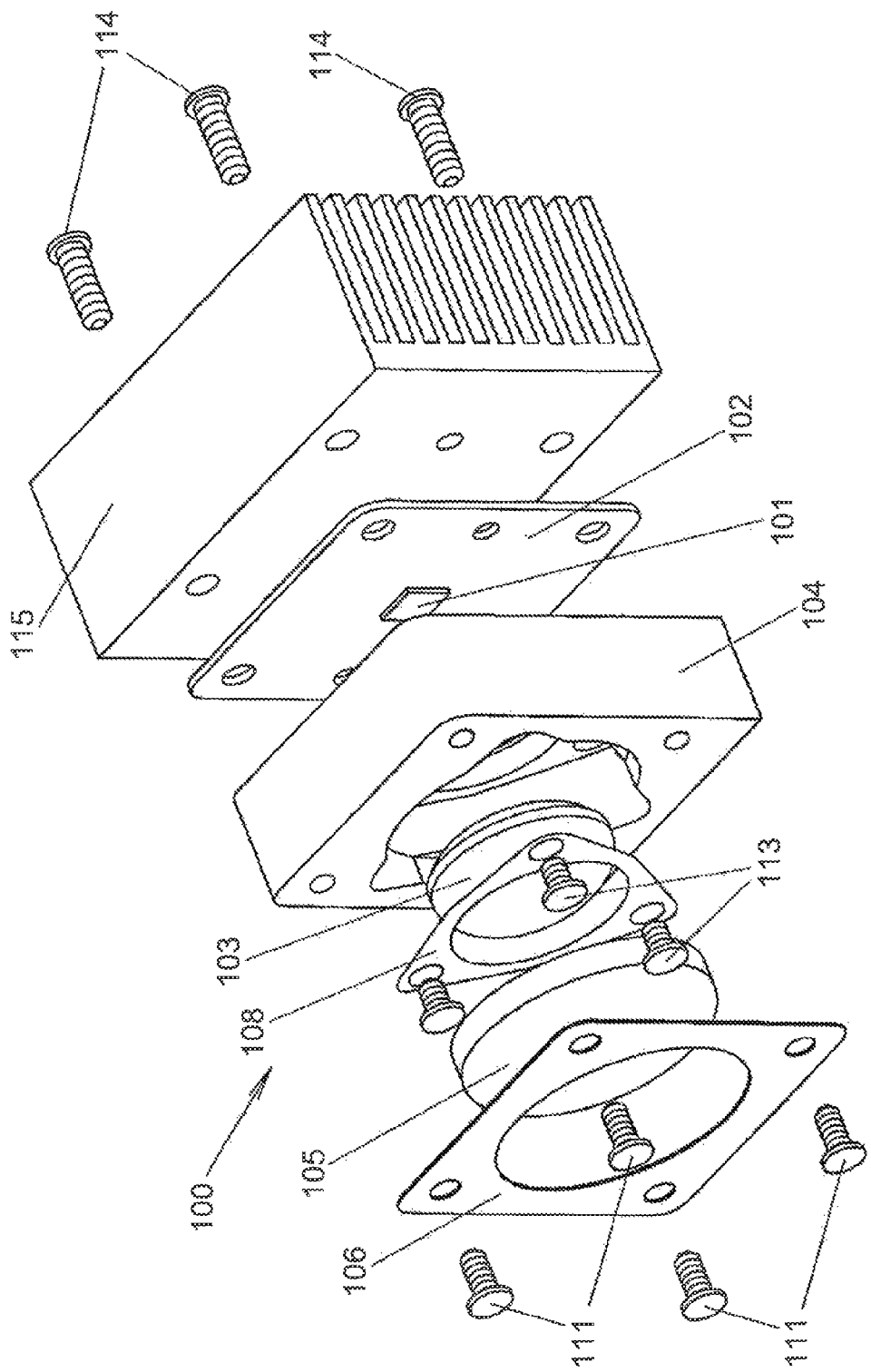
FIG. 5 is an exploded perspective view of the luminous light emitting device according to the embodiment of the invention.
Figure 6:
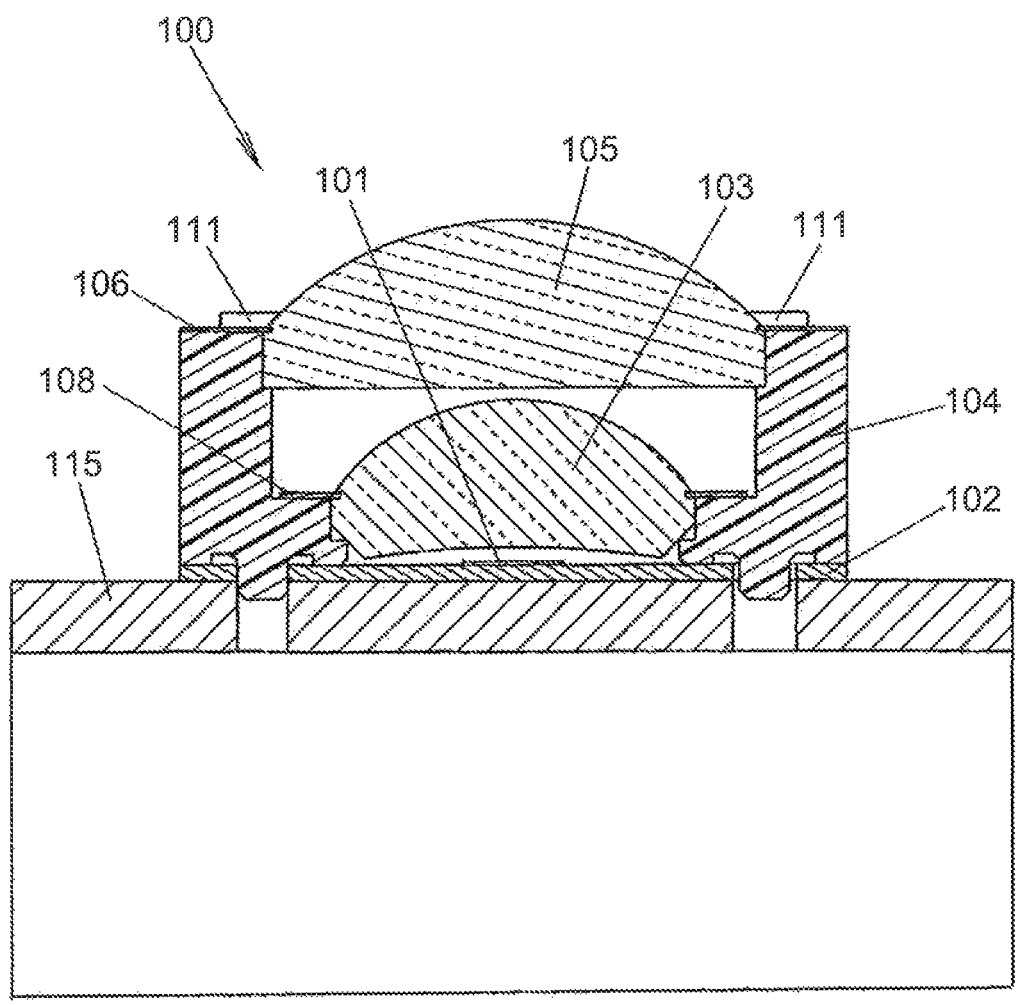
FIG. 6 is a sectional view of the luminous light emitting device according to the embodiment of the invention.

FIG. 4 is an external perspective view of the luminous light emitting device 100, FIG. 5 is an exploded perspective view of the luminous light emitting device 100, and FIG. 6 is a sectional view of the luminous light emitting device 100.

As shown in FIG. 4, the luminous light emitting device 100 has a substantially rectangular parallelepiped shape and is configured so that the luminescent material plate 101 incorporated therein is covered and sealed tight.

As shown in FIG. 5, the luminous light emitting device 100 includes a first lens clamping metallic plate 106, a first collective lens 105, a lens holder 104, a second collective lens 103, a second lens clamping metallic plate 108 which biases the second collective lens 103, the luminescent material plate 101, a luminescent material holding metallic plate 102, and a heat sink 115 which dissipates heat generated by optic energy sequentially in this order from an excitation light entrance side. These constituent members are fixed to the lens holder 104 from the front and rear with screws 111, 113, 114 so that the members are integrated with each other.

The first lens clamping metallic plate 106 is a substantially square thin metallic plate and has a circular window hole which is provided in a central portion thereof. The first lens clamping metallic plate 106 is a clamping member which is screwed to the lens holder 104 from the front with the screws 111 to thereby hold the first collective lens 105 within the lens holder 104.

The first collective lens 105 is a planoconvex lens made of glass as shown in FIG. 6 and constitutes a first lens of a group of collective lenses which collects excitation light which is incident on the luminous light emitting device 100.

The second lens clamping metallic plate 108 is a substantially triangular thin metallic plate and has circular window hole in a central portion thereof. This second lens clamping metallic plate 108 is a clamping member which is screwed to the lens holder 104 from the front with the screws 113 to thereby hold the second collective lens 103 within the lens holder 104.

The lens holder 104 is made of hard resin and has a substantially rectangular parallelepiped shape with a circular lens accommodating hole formed in a central portion thereof. This lens holder 104 is a holding member which incorporates therein the group of collective lenses made up of the first collective lens 105 and the second collective lens 103. The lens holder 104 is joined at a rear surface thereof to a front surface of the luminescent material holding metallic plate 102, which will be described later, so as to close and seal tight the luminescent material plate 101.

The second collective lens 103 is a convex meniscus lens made of glass as shown in FIG. 6 and constitutes a second lens of the group of collective lenses which collects excitation light which is incident on the luminous light emitting device 100.

The luminescent material plate 101 is a square plate which emits luminous light of the green wavelength range by using excitation light emitted from the excitation light sources 71 and functions as a luminescent plate which emits luminous light when receiving the excitation light.

Specifically, the luminescent material plate 101 is formed by sintering a light transmitting inorganic material such as Al203 or the like and a plurality of luminescent materials such as YAG:Ce or the like. The plurality of luminescent materials are dispersed, for example, at uniform intervals in the light transmitting inorganic material. These luminescent materials emit green luminous light (having a wavelength value in the range of 492 to 577 nm) by blue excitation light (having a wavelength value in the range of 455 to 492 nm) being shone thereon. It is noted that the luminescent material plate 101 is made of a material having superior heat resistance since the excitation light shone thereon has large optical energy.

In addition, a surface of a side of the luminescent material plate 101 which is disposed to face the luminescent material holding metallic plate 102 is mirror finished through silver deposition or the like so that the surface is formed into a reflecting surface which reflects light. This reflecting surface reflects luminous light which is emitted from the luminescent materials towards the luminescent material holding metallic plate 102 which is a substrate and excitation light which passes through the luminescent material plate 101 to return them to the interior of the luminescent material plate 101 for emission from the luminescent material plate 101 towards the excitation light sources, whereby the luminous efficiency is enhanced.

The luminescent material holding metallic plate 102 is a substantially square metallic substrate, and the luminescent material plate 101 is fixed to a central portion of the plate 102 through bonding or the like. Then, the luminescent material plate 101 is disposed so as to be covered and sealed tight by being sandwiched by the luminescent material holding metallic plate 102 and the second collective lens 103 via the lens holder 104, whereby the luminescent material plate 101 is shut off from outside air to thereby be protected from dust. Thus, the luminescent material plate 101 is given a dust-proof construction.

The heat sink 115 is a metallic heat dissipating member and includes cooling fins at the rear thereof to dissipate heat generated by optical energy.

It is noted that the second collective lens 103 is not limited to the convex meniscus lens and hence that a planoconvex lens or a biconvex lens may be adopted as the second collective lens 103. Additionally, the second collective lens 103 is held in such a way that a most projecting portion on a rear surface of the lens is spaced apart from the luminescent material holding metallic plate 102 which is the substrate by the lens holder 104. Also, the first collective lens 105 is not limited to the planoconvex lens.

[Covering and Sealing Form 2]

As the configuration of the lens holder 104, in addition to the configuration shown in FIG. 6 in which the lens holder 104 holds the first collective lens 105 and the second collective lens 103 at a rear end of a circumferential edge of each of the lenses, the lens holder 104 may be configured or modified so as to hold the first collective lens 105 at the rear end of the circumferential edge of the lens and the second collective lens 103 at a front surface of the circumferential edge of the lens.

A luminous light emitting device 200 having a lens holder 204 which replaces the lens holder 104 will be described by reference to the drawings as a modified example to the lens holder 104. FIG. 7 is an exploded perspective view of the luminous light emitting device 200 in which a second lens locking portion 207 is integrated with the lens holder 204. FIG. 8 is a sectional view of the luminous light emitting device 200.

As shown in FIGS. 7 and 8, this luminous light emitting device 200 is configured so that firstly, a first collective lens 105 is accommodated in the lens holder 204 from an excitation light entrance side and a first lens clamping metallic plate 106 is fixed to the lens holder 204 at four locations with screws 111 so as to hold the first collective lens 105.

Then, in the luminous light emitting device 200, a second collective lens 103 is accommodated in the lens holder 204 where the first collective lens 105 is fixed from the rear of the lens holder 204 so as to be locked at a second lens locking portion 207 which has an elastic force. Following this, a luminescent material holding metallic plate 102 to which a luminescent material plate 101 is fixed through bonding in advance and a heat sink 115 are disposed in predetermined positions on a rear surface of the lens holder 204. Then, the luminescent material holding metallic plate 102 and the heat sink 115 are fastened integrally to the lens holder 204 at four locations with screws 112 from the rear of the lens holder 204.

As shown in FIG. 7, in this luminous light emitting device 200, the second lens locking portion 207 which biases the second collective lens 103 to the rear is provided on the lens holder 204, whereby the necessity of the second lens clamping metallic plate 108, which is the exclusive constituent component of the luminous light emitting device 100, and the screwing operation involved in screwing the plate 108 (refer to FIG. 5, FIG. 6 in the covering and sealing Form 1) is obviated so as not only to reduce the number of constituent components but also to improve the assembling performance of the luminous light emitting device 200.

Further, in the luminous light emitting device 200, as shown in FIG. 8, the second collective lens 103 is a convex meniscus lens, and a circumferential edge at a rear end of the lens 103 is formed into a flat plane and is attached tightly to the luminescent material holding metallic plate 102 which constitutes a substrate.

In the luminous light emitting device 200 which is configured in the way described above, the second collective lens 103 is biased towards the luminescent material holding metallic plate 102 by the second lens locking portion 207 of the lens holder 204 so that the flat portion at the rear end circumferential edge of the second collective lens 103 is joined tightly to a front surface of the luminescent material holding metallic plate 102, thereby making it possible to close and seal tight the luminescent material plate 101.

Also, when the second collective lens 103 is inserted from a rear side of the lens holder 204 to be held therein, in addition to the configuration in which the second lens locking portion 207 is formed integrally with the lens holder 204 so as to bias the second collective lens 103 to the rear, a configuration may be adopted in which a second lens clamping metallic plate 108 is attached to a lens holder 204 which does not include the second lens locking portion 207 so as to bias the second collective lens 103 to the rear.

Thus, according to the embodiment, it is possible to provide the light source unit provided with the dust-proof measure in which the luminescent material holding metallic plate 102 to which the luminescent material plate 101 is held through bonding is covered by the second collective lens 103 so as to close and seal tight the luminescent material plate 101 and the projector 10 which includes the light source unit.

In addition, according to the embodiment, the luminous light emitting device 100 of the small green light source device 80 can easily be configured to have the construction in which the luminescent material plate is covered and sealed tight, thereby making it possible to provide the light source unit which can emit luminous light stably and have a long life thereof.

Additionally, according to the embodiment, attaching the rear surface of the collective lens tightly and directly to the front surface of the substrate facilitates the assembling of the luminous light emitting device in such a way as to seal the luminescent material plate 101 therein by the simple configuration. In addition, flattening the attaching surface of the collective lens facilitates the obtaining of high air-tightness.

According to the embodiment, it is possible to achieve the luminescent material plate tight covering and sealing construction in which the tight covering and sealing capability of the luminescent material plate can be maintained by the elastic element.

In addition, according to the embodiment, the application of the lens holder 204 with which the elastic element is integrated can achieve the luminescent material plate tight covering and sealing construction in which the tight covering and sealing capability of the luminescent material plate can be maintained while reducing the number of constituent components. Further, holding the collective lens in such a way as to define a gap between the collective lens and the luminescent material holding metallic plate 102 can give the degree of freedom in designing the curved surface of the collective lens which faces the luminescent material plate.

According to the embodiment, the provision of the first dichroic mirror 141 which transmits the light of the blue wavelength range which is excitation light and the light of the red wavelength range and reflects the light of the green wavelength range which is luminous light facilitates and ensures the separation of the axis of the luminous light from the axis of the excitation light, which facilitates the change in combination and arrangement of the excitation light source device 70 and the luminous light emitting device 100.

It is noted that the luminous light emitting devices 100, 200 may be configured so that excitation light is obliquely incident on the first collective lens so that the axes of the excitation light and the luminous light are separated from each other, so that the first dichroic mirror 141 is omitted.

Further, according to the embodiment, since the heat sink 115 is provided at the rear of the luminescent material plate 101 to provide the heat dissipating effect, the luminous light emitting devices 100, 200 can be made highly reliable.

While the invention has been described based on the embodiment and its modified example, the embodiment and its modified example described only represent the examples of the invention, and hence, there is no intention at all to limit the scope of the invention by them. The novel embodiment can be carried out in other various forms and various omissions, replacements and alterations or modifications can be made thereto without departing from the spirit and scope of the invention. These embodiments and their modifications so made are to be included in the spirit and scope of the invention and are also to be included in the scope of inventions claimed under claims and their equivalents.

What is claimed is:

1. A light source unit comprising:
    an excitation light source device which emits excitation light; and
    a luminous light emitting device,
    wherein the luminous light emitting device comprises:
        a luminescent material plate onto which the excitation light emitted from the excitation light source device is shone to emit luminous light of a wavelength which is different from that of the excitation light;
        a substrate on which the luminescent material plate is rested;
        a collective lens which covers the luminescent material plate;
        a lens holder which holds the collective lens; and
        a lens locking unit which biases the collective lens to a rear of the luminous light emitting device and which is provided on the lens holder,
    wherein the luminescent material plate is covered and sealed tight by at least the substrate and the collective lens, and
    wherein the collective lens is a convex meniscus lens, and a circumferential edge on a concave surface side of the collective lens is attached tightly to a luminescent material plate side of the substrate.

2. The light source unit according to claim 1, wherein a surface of the lens holder which is opposite to its excitation light entrance side is attached tightly to the substrate so as to cover and seal tight the luminescent material plate which is disposed on an excitation light entrance side surface of the substrate.

3. The light source unit according to claim 1, wherein in the collective lens, which is the convex meniscus lens, an attaching surface of the circumferential edge on the concave surface side which is attached to the substrate is a flat surface.

4. The light source unit according to claim 1, wherein the collective lens is biased towards the substrate by the lens locking unit which comprises an elastic element.

5. The light source unit according to claim 4, wherein the lens locking unit comprising the elastic element is formed integrally with the lens holder.

6. The light source unit according to claim 1, wherein the lens holder holds the collective lens in such a way as to define a gap between the substrate and the collective lens.

7. The light source unit according to claim 1, further comprising:
    a dichroic mirror which is disposed on an excitation light optical path from the excitation light source device to the luminescent material plate, the dichroic mirror being configured to transmit the excitation light and to reflect the luminous light or configured to reflect the excitation light and to transmit the luminous light.

8. The light source unit according to claim 1, wherein a heat sink is provided on a rear surface of the substrate.

9. A projector comprising:
    the light source unit according to claim 1;
    a display element;
    a light source-side optical system which guides light from the light source unit to the display element;
    a projection-side optical system which projects an image emitted from the display element onto a screen; and
    a projector control unit which controls the light source unit and the display element.

* * * * *